Patented Aug. 11, 1953

2,648,667

UNITED STATES PATENT OFFICE 2,648,667

ESTERS OF 1-AZABICYCLOALKANOLS

Leo Henryk Sternbach, Upper Montclair, N. J., assignor to Hoffmann-La Roche Inc., Nutley, N. J., a corporation of New Jersey No Drawing. Application April 18, 1951, Serial No. 221,733

9 Claims. (Cl. 260—294.3)

This invention relates to new chemical compounds. Broadly, these compounds may be designated as esters of basic bicyclic alcohols and salts of said esters. The compounds possess utility in the field of medicinals, and more particularly in the class of spasmolytics.

The alcohols useful in practicing the invention are certain 1-azabicycloalkanols, viz., 1-azabicyclo[2.2.2]-3-octanol, 1-azabicyclo[2.2.2]-3-methyl-3-octanol, 1-azabicyclo[3.2.1]-6-octanol, 1-azabicyclo[3.3.1]-4-nonanol, and 1-azabicyclo[3.3.1]-2-methyl-4-nonanol. These alcohols are represented respectively by the following Formulas I, II, III, IV and V.

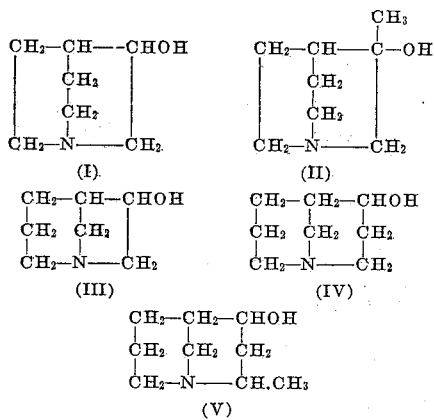

The esters of the invention are those of any of the above alcohols with an acid selected from the group consisting of diphenylacetic acid, fluorene-9-carboxylic acid, benzilic acid, acetylmandelic acid, tropic acid, and atropic acid. Both the alcohols and the esters of the invention are basic, and form salts; e. g. addition salts with inorganic and organic acids such as hydrochloric, hydrobromic, sulfuric, phosphoric, tartaric, and picric acids, and quaternary salts with quaternizing agents such as methyl bromide, ethyl bromide, butyl bromide, methyl sulfate, methyl-p-toluenesulfonate, benzyl chloride and benzyl bromide. The salts of the alcohols and of the esters are also included in the invention.

The 1-azabicycloalkanols of the invention can be synthesized from appropriate pyridine compounds. Broadly described, the synthesis involves the following steps: (a) converting the pyridine compound to an N-carbalkoxy-alkyl-C-carbalkoxy-piperidine, (b) ring closure of the latter by a Dieckmann condensation to a carbalkoxy-1-azabicycloalkanone, (c) hydrolysis and decarboxylation of the latter to form the corresponding 1-azabicycloalkanone, and (d) transformation of the latter into a 1-azabicycloalkanol.

Step (a) can be accomplished in two ways: (1) A C-carbalkoxy-pyridine can be reacted with an alkyl haloalkanoate to form an N-carbalkoxyalkyl-C-carbalkoxy-pyridinium halide, and the latter can then be hydrogenated to yield the desired N-carbalkoxyalkyl-C-carbalkoxy-piperidine. (2) Or, a C-carbalkoxy-piperidine can be reacted with an alkyl alkenoate to form the desired N-carbalkoxyalkyl-C-carbalkoxy-piperidine. In step (b), the Dieckmann condensation can be performed by treating the N-carbalkoxyalkyl-C-carbalkoxy-piperidine with potassium metal in boiling toluene. In step (c), the hydrolysis and decarboxylation reaction can be effected by refluxing the carbalkoxy-1-azabicycloalkanone product of step (b) in concentrated aqueous hydrochloric acid, and then evaporating to dryness. In step (d), if the alcohol desired is a secondary alcohol, e. g., 1-azabicyclo[2.2.2]-3-octanol, the process requires a reduction, which can be effected catalytically, using either a platinum catalyst or a Raney nickel catalyst; or chemically, using reducing agents such as sodium and alcohol, or lithium aluminum hydride. On the other hand, if the alcohol desired is the tertiary alcohol 1-azabicyclo[2.2.2]-3-methyl-3-octanol, it is necessary to condense 1-azabicyclo[2.2.2]-3-octanone with methyl lithium, followed by hydrolysis.

The esters of the invention can be obtained by reacting one of the above 1-azabicycloalkanols with an esterifying derivative of the desired acid, or with an esterifying derivative of an acid which is easily converted into the desired acid. Advantageously, the alcohol (or the corresponding alkali metal alcoholate) is reacted with the appropriate acid chloride in a solvent such as benzene.

The 1-azabicycloalkanols and their esters, as well as acid addition salts and quaternary salts of the foregoing, exist in both racemic and optically active forms, all of which are comprehended within the invention.

The invention is further disclosed in the following examples, which are illustrative of the invention, but not limitative thereof, since equivalents will be obvious to those skilled in the art.

EXAMPLE 1

*1-carbethoxymethyl-4-"carbalkoxy"-piperidine*

A mixture of 274 g. of methyl isonicotinate, 367 g. of ethyl bromoacetate and 125 cc. of ethyl alcohol was stirred without heating for 4 hours in a flask equipped with a reflux condenser. (The reaction was exothermic and precautions were taken to keep the temperature below 70° C.) The reaction mixture was then left for 15 hours at room temperature.

The reaction product (1-carbethoxymethyl-4-carbomethoxy-pyridinium bromide) was obtained in crystalline form. (It formed prisms melting at 166°–169° C. after recrystallization from a mixture of isopropanol and acetone.) It was not necessary to isolate it. For the following reduction step, the reaction mixture was brought into solution by the addition of about 1 liter of warm ethyl alcohol. It was then hydrogenated at about 30 atm. pressure in the presence of 2 g. of platinum oxide. The temperature rose during this reaction to about 40° C. After the calculated amount of hydrogen had been absorbed, the catalyst was filtered off, the solution was concentrated in vacuo, and the residual syrup was dissolved in ice water. Benzene was added and the mixture was made alkaline with an excess of concentrated ice cold potassium carbonate solution. The temperature was kept low by continuous addition of ice, and the benzene layer was separated and dried with sodium sulfate. The dried benzene solution was concentrated in vacuo and the residual oil was distilled in vacuo. B. P. 30 mm.=175°–182° C., $n_D^{25}$=1.4613–1.4628. During the reduction, partial alcoholysis occurred, and the product isolated was 1-carbethoxymethyl-4-"carbalkoxy"-piperidine, wherein "carbalkoxy" represents a mixture of carbomethoxy and carbethoxy.

EXAMPLE 2

*1-azabicyclo[2.2.2]-3-octanone*

100 g. of potassium were pulverized in 200 cc. of hot toluene in a heated three-neck flask equipped with an efficient condenser, stirrer and dropping funnel. To the refluxing potassium suspension were added in small portions 229 g. of the product of Example 1 and about 700 cc. of toluene. This addition had to be carried out very cautiously; the onset of the exothermic reaction is sometimes delayed. The addition was finished in about 1 hour. To complete the reaction, the refluxing and stirring were continued for about 4 hours. The reaction mixture was then cooled to about +5° C. and about 50 cc. isopropanol were added to decompose unreacted potassium. Then 2.5 liters of concentrated hydrochloric acid were added and the mixture was refluxed for 15 hours, and then concentrated in vacuo to dryness. To the residue was added with cooling an excess of 50 per cent potassium hydroxide. Ether was then added and the resulting mixture was filtered through a fritted glass funnel, thus removing the precipitated potassium chloride. The ethereal and aqueous layers were separated, and the aqueous layer was extracted repeatedly with 500 cc. portions of ether. The organic solutions were combined, dried over sodium sulfate and concentrated in vacuo. Aqueous hydrochloric acid was added to the residue until the solution became acid. The mixture was then diluted with distilled water to about 300 cc., heated with decolorizing charcoal, filtered and concentrated in vacuo to dryness. The residue was treated with isopropanol, and the precipitated crystalline product was filtered off. The product was recrystallized from a mixture of water and isopropanol and was identified as 1-azabicyclo[2.2.2]-3-octanone hydrochloride; prisms, M. P. 311°–313° C., with decomposition.

A solution of 50 g. of the above ketone-hydrochloride in 30 cc. of water was made alkaline by the addition of 30 g. of potassium hydroxide. After the alkali was dissolved, 35 g. of granular potassium carbonate were added. The free basic ketone was then extracted from the viscous mixture by shaking with 4 portions of hot benzene (300 cc. in each portion). The benzene extracts were decanted, filtered over sodium sulfate in order to remove any suspended alkali, and concentrated in vacuo. The residual 1-azabicyclo[2.2.2]-3-octanone was purified by sublimation (50°–70° C./0.5 mm. Hg); it can also be purified by recrystallization from petroleum ether. It formed feathery crystals melting at 147°–148° C.

The picrate of the above ketone base (prisms from acetone) melted at 209°–211° C.

EXAMPLE 3

*1-azabicyclo[2.2.2]-3-octanol*

The product of Example 2 was reduced by five separate methods, as follows:

A. A solution of 50 g. of 1-azabicyclo[2.2.2]-3-octanone hydrochloride in 200 cc. of water was hydrogenated at room temperature and 50 atm. pressure with 1 g. of platinum oxide as catalyst. After the calculated amount of hydrogen had been absorbed, the mixture was filtered and concentrated in vacuo to dryness. The residual product was recrystallized from a mixture of methanol and acetone and formed prisms melting above 300° C. It was identified as 1-azabicyclo[2.2.2]-3-octanol hydrochloride.

A solution of 50 g. of 1-azabicyclo[2.2.2]-3-octanol hydrochloride in 30 cc. water was made alkaline with 30 g. of potassium hydroxide. After the alkali was dissolved 35 g. of granular potassium carbonate were added. The free basic alcohol was then extracted from the viscous mixture by shaking with four portions of boiling benzene (300 cc. in each portion). The benzene extracts were decanted and filtered over anhydrous sodium sulfate, to remove any suspended alkali. The combined benzene solutions were concentrated in vacuo. The residue was recrystallized from benzene and identified as 1-azabicyclo[2.2.2]-3-octanol, M. P. 221°–223° C. The product can also be purified by recrystallization from acetone, or by sublimation in vacuo (120° C./20 mm. Hg).

The picrate of the above azabicycloalkanol was prepared by combining an alcoholic solution of 0.5 g. of the bicycloalkanol with an alcoholic solution of 1.4 g. picric acid. The precipitated picrate was recrystallized from alcohol, and formed yellow prisms melting at 212°–214° C.

B. The crude ketone product obtained in the Dieckmann condensation described in Example 2 above can be directly hydrogenated without isolating the ketone in pure form as the hydrochloride. Approximately 80 g. of the basic residue obtained from the ether extracts were dissolved in 300 cc. of acetic acid and hydrogenated as in Example 3 A above with 4 g. of platinum oxide as catalyst. The mixture was filtered, made acid to congo paper with hydrochloric acid and concentrated in vacuo. The residue was heated with isopropanol, the mixture was cooled and the crystalline precipitate filtered off, yielding a product identical with the 1-azabicyclo[2.2.2]-3-octanol hydrochloride obtained in Example 3 A above.

C. The crude ketone product (residue of the ether extract) used in Example 3 B above was also reduced by dissolving in water and hydrogenating with Raney nickel as catalyst (room temperature, 50 atm. pressure). The hydrogenation product was neutralized with hydrochloric acid and isolated as the hydrochloride.

D. To a refluxing solution of 3.32 g. of 1-azabicyclo[2.2.2]-3-octanone hydrochloride in 100 cc. of absolute alcohol were quickly added 4.6 g. of sodium. When all the sodium had dissolved, the mixture was diluted with water and concentrated in vacuo. The viscous residue was extracted with boiling benzene as described above. The benzene solution was concentrated in vacuo, and the residue was recrystallized from benzene in order to remove any unreacted ketone. The product was identified as 1-azabicyclo[2.2.2]-3-octanol.

E. A solution of 5.0 g. of 1-azabicyclo[2.2.2]-3-octanone in 25 cc. of dry ether was added dropwise to a stirred solution of 1 g. of lithium aluminum hydride in 100 cc. of ether. The mixture was refluxed for an additional hour, decomposed with water and concentrated in vacuo to a small volume. Potassium hydroxide was added to the residual aqueous mixture, and the basic alcohol was extracted with hot benzene as described above.

EXAMPLE 4

*3-diphenylacetoxy-1-azabicyclo[2.2.2]octane*

15.2 g. of diphenylacetyl chloride were added to a warm solution of 7.6 g. of 1-azabicyclo[2.2.2]-3-octanol in 300 cc. of benzene. The mixture was refluxed for 3 hours, cooled and acidified with a slight excess of dilute ice cold hydrochloric acid. The aqueous acid solution was separated and washed with benzene. The base was freed by the addition of an excess of ice cold alkali, and was extracted with ether. The ether solution was dried and concentrated in vacuo. The residual product solidified after a short time. It was recrystallized from a mixture of benzene and petroleum ether and formed prisms melting at 95°-96° C., identified as 3 - diphenylacetoxy - 1 - azabicyclo[2.2.2]octane.

The above ester base was dissolved in the calculated amount of 3 N sulfuric acid. The solution was concentrated in vacuo and the residual syrup was dissolved in hot acetone. The cooled solution precipitated fine colorless plates or flat needles melting at 95°-103° C. The product was recrystallized by dissolving in a small amount of water, removing most of the water in vacuo and adding to the residual syrup sufficient acetone to precipitate the crystalline salt. The product was identified as 3-diphenylacetoxy-1-azabicyclo[2.2.2]octane sulfate dihydrate, $C_{42}H_{46}O_4N_2 \cdot H_2SO_4 \cdot 2H_2O$ 1 g. of the above ester base was dissolved in 10 cc. of acetone containing 2.5 g. of methyl bromide. The solution was left at room temperature for 48 hours and was then concentrated in vacuo. The residue was dissolved in water and the solution extracted with ether. The aqueous solution was then concentrated in vacuo and recrystallized from a mixture of ethanol, ether and petroleum ether; plates melting at 212°-213° C. The product thus obtained was the methyl bromide quaternary salt of 3-diphenylacetoxy-1-azabicyclo[2.2.2]octane.

2 g. of the above ester base were dissolved in 20 cc. of ethyl bromide. The mixture was left at room temperature until the initially precipitated oil became crystalline. Then the mixture was concentrated by distilling off excess ethyl bromide, and the residue was recrystallized from a mixture of alcohol and ether; prisms melting at 205°-206° C. The product was the ethyl bromide quaternary salt of 3 - diphenylacetoxy - 1 - azabicyclo[2.2.2]octane.

To a solution of 1 g. of the above ester base in 10 cc. of benzene were added 2 cc. of benzyl bromide. After 24 hours a crystalline precipitate formed, which was filtered off and recrystallized from isopropanol; prisms melting at 171°-173° C. The product was the benzyl bromide quaternary salt of 3-diphenylacetoxy-1-azabicyclo[2.2.2]-octane.

EXAMPLE 5

*3-(fluorene-9-carboxy)-1-azabicyclo-[2.2.2]octane*

6.9 g. of fluorene-9-carboxylic acid chloride were added to a solution of 3.8 g. of 1-azabicyclo[2.2.2]-3-octanol in 150 cc. of benzene. The mixture was refluxed for 3 hours, kept for a few hours at 10° C. and filtered. The precipitated hydrochloride contained benzene of crystallization. It was recrystallized as follows: A solution of the crystalline precipitate in isopropanol was concentrated to dryness, the residual oil was dissolved in a small amount of acetone and a larger amount of benzene was added in portions. Crystals were not obtained in the absence of benzene nor when insufficient benzene was present. The product was 3-(fluorene-9-carboxy)-1-azabicyclo[2.2.2]-octane hydrochloride, prisms melting at 201°-205° C. An aqueous solution of the product was slightly turbid due to the suspended benzene. It was cleared by distilling off a small portion of the medium.

The free base was obtained as a yellowish oil by the addition of alkali to the aqueous solution of the hydrochloride and extraction with ether. It yielded a crystalline sulfate.

EXAMPLE 6

*3-benziloyloxy-1-azabicyclo[2.2.2]octane*

5.12 g. of 1-azabicyclo[2.2.2]-3-octanol were refluxed with a suspension of 0.92 g. of finely divided sodium in 50 cc. of toluene, until most of the sodium had reacted (about 4 hours). The thus obtained suspension of the white amorphous alcoholate was cooled with ice, and reacted with 10.16 g. of diphenylchloroacetyl chloride, which was added in form of a solution in approximately 40 cc. of toluene. The mixture was stirred for 1 hour at room temperature. Small amounts of unreacted sodium were destroyed with isopropanol, and 120 cc. of 1 N hydrochloric acid were then added. The mixture was refluxed for ½ hour, in order to convert the first formed product, diphenylchloroacetic acid ester of 1-azabicyclo[2.2.2]-3-octanol, into the corresponding benzilic acid ester. The toluene phase was separated and discarded. The aqueous phase, together with a precipitated water- and toluene-insoluble oil, was made alkaline and extracted repeatedly with chloroform. The chloroform solution was concentrated in vacuo. The residue was recrystallized from a mixture of acetone and ether (alternatively, from chloroform and ether), and formed needles melting at 164°-165° C. It was identified as 3-benziloyloxy-1-azabicyclo[2.2.2]octane.

The hydrochloric acid salt of the above ester base was prepared by the addition of the calculated amount of 1 N hydrochloric acid to a solution of the base in methanol. It was crystallized by concentrating the methanol solution in vacuo to a syrup and treating the residue with acetone. The hydrochloride was thus obtained in the form of rosettes melting at 239°–244° C.

3-benziloyloxy-1-azabicyclo[2.2.2]octane methobromide was prepared by adding 20 cc. of a 30 per cent solution of methyl bromide in ether to a solution of 2.5 g. of 3-benziloyloxy-1-azabicyclo[2.2.2]octane in 20 cc. of chloroform. After standing for 3 hours at room temperature and 15 hours at +5° C., a crystalline precipitate had formed. This was filtered off and recrystallized from a mixture of methanol, acetone, and ether; prisms melting at 240°–241° C.

To a solution of 1.5 g. of the above ester base in 10 cc. of chloroform were added 10 cc. of ethyl bromide. After 24 hours the mixture was concentrated and the residue recrystallized from a mixture of methanol and acetone; needles melting at 230°–231° C. The product was 3-benziloyloxy-1-azabicyclo[2.2.2]octane ethobromide.

To a solution of 1.5 g. of the above ester base in 4 cc. of chloroform were added 3 cc. of benzyl bromide. After 24 hours the mixture was concentrated in vacuo and the residue was dissolved in a small amount of isopropanol. The reaction product crystallized in needles. It was filtered off and dissolved in methanol. The solution was concentrated in vacuo to dryness and the amorphous residue was crystallized by trituration with isopropanol; fine needles melting at 223°–224° C. The product was the benzyl bromide quaternary salt of 3-benziloyloxy-1-azabicyclo[2.2.2]octane.

To a solution of 1 g. of 3-benziloyloxy-1-azabicyclo[2.2.2]octane in 15 cc. of chloroform were added 10 cc. of n-butyl bromide. After 24 hours, the mixture was concentrated and the residue was recrystallized from a mixture of methanol and acetone; clusters of plates melting at 246°–247° C. The product was the n-butyl bromide quaternary salt of 3-benziloyloxy-1-azabicyclo[2.2.2]octane.

EXAMPLE 7

*Mixture of the tropic and atropic acid esters of 1-azabicyclo[2.2.2]-3-octanol*

A benzene solution of 4.5 g. of freshly prepared acetyl tropic acid chloride was added to a solution of 2.6 g. of 1-azabicyclo[2.2.2]-3-octanol in 100 cc. of benzene. The mixture was left for 14 hours at room temperature and was then heated to 50° C. for 2 hours. Dilute hydrochloric acid and ice were then added to the cooled reaction mixture. The acid aqueous solution was made alkaline, and the precipitated oily basic ester was extracted with ether. The ether solution was concentrated in vacuo, the residue was dissolved in alcohol, and titrated (while warming, 30°–45° C.) with 1 N sodium hydroxide (phenolphthalein as indicator). This procedure completed the hydrolysis of any of the acetyl-tropic acid ester which might have remained despite the preceding treatment with acid and alkali. The mixture was diluted with water and extracted with ether. The ether solution was concentrated in vacuo and a straw colored oily residue was obtained. The product was purified by dissolving in dilute ice cold acid, extracting neutral by-products, and reprecipitating the basic ester component with ice cold alkali. The product was identified as a mixture of the tropic and atropic acid esters of 1-azabicyclo[2.2.2]-3-octanol.

EXAMPLE 8

*1-carbethoxymethyl-3-carbethoxy-piperidine*

A mixture of 302 g. of ethyl nicotinate, 367 g. of ethyl bromoacetate and 125 cc. of ethyl alcohol was stirred for 4 hours without heating. (The reaction was exothermic, and the reaction vessel was cooled to keep the temperature below 70° C.) The mixture was then left at room temperature for 15 hours. The quaternary compound formed, 1-carbethoxymethyl-3-carbethoxy-pyridinium bromide, was not isolated. The viscous solution was diluted with 1 liter of alcohol and hydrogenated at about 70 atm. pressure in the presence of 2.0 g. of platinum oxide. The temperature rose to about 50° C. After the calculated amount of hydrogen was absorbed, the catalyst was filtered off and the solvent was removed in vacuo. The residual syrup was dissolved in ice water, benzene was added and the mixture was made alkaline with an excess of concentrated ice cold potassium carbonate solution. The temperature was kept low by continuous addition of ice, and the benzene layer was separated and dried with sodium sulfate. The dried benzene solution was concentrated in vacuo and the residual oil was distilled in vacuo. B. P. 5 mm.=147°–149° C., $n_D^{25}$=1.4580. The product was 1-carbethoxymethyl-3-carbethoxy-piperidine.

EXAMPLE 9

*1-azabicyclo[3.2.1]-6-octanone*

100 g. of potassium were pulverized in 200 cc. of hot toluene in a heated three-neck flask equipped with an efficient condenser, stirrer and dropping funnel. To the refluxing potassium suspension were cautiously added 243 g. of the diethyl ester of 3-carboxy-piperidine-1-acetic acid (the product of Example 8) and about 500 cc. of toluene. The addition was finished in about 1 hour. To complete the reaction, the refluxing and stirring were continued for about 5 hours. The reaction mixture was then cooled to about +5° C., and about 50 cc. of isopropanol were added to decompose unreacted potassium. Then 2.5 liters of concentrated hydrochloric acid were added. The mixture was refluxed for 15 hours, and then concentrated in vacuo to dryness. To the residue was added with cooling an excess of 50 per cent potassium hydroxide. Benzene was then added and the resulting mixture was filtered through a fritted glass funnel, to remove the precipitated potassium chloride. The benzene layer and the aqueous layers were separated, and the aqueous layer was extracted repeatedly with 400 cc. portions of benzene. The organic solutions were combined, dried over sodium sulfate and concentrated in vacuo. Aqueous hydrochloric acid was added to the residue until the solution became acid. The mixture was then diluted with distilled water to about 300 cc., heated up with decolorizing charcoal, filtered and concentrated in vacuo to dryness. The residue was treated with isopropanol, and the crystalline precipitate was filtered off. The product was recrystallized from a mixture of water and acetone; prisms, melting above 270° C. It was identified as 1-azabicyclo[3.2.1]-6-ocatanone hydrochloride.

A solution of 50 g. of 1-azabicyclo[3.2.1]-6-octanone hydrochloride in 30 cc. water was made alkaline with 30 g. of potassium hydroxide. After the alkali was dissolved, 35 g. of granular potassium carbonate were added. The free basic ketone was then extracted from the viscous mixture by shaking with 4 portions of hot benzene (300 cc. in each portion). The benzene extracts were decanted and then concentrated in vacuo. The residual ketone, 1-azabicyclo[3.2.1]-6-octanone, was purified by sublimation (50°–70° C./0.5 mm. Hg). It formed feathery crystals melting at 129°–130° C.

Alcoholic solutions of 0.5 g. of the above ketone base and 1.4 g. of picric acid were combined. The precipitated picrate was recrystallized from a mixture of ethanol and acetone; yellow prisms, melting at 202°–204° C.

EXAMPLE 10

*1-azabicyclo[3.2.1]-6-octanol*

A. A solution of 50 g. 1-azabicyclo[3.2.1]-6-octanone hydrochloride in 200 cc. water was hydrogenated at room temperature and 100 atm. pressure with 1 g. of platinum oxide as catalyst. After the calculated amount of hydrogen had been absorbed, the mixture was filtered and concentrated in vacuo to dryness. The crude hydrochloride was recrystallized from a mixture of methanol and acetone; prisms melting above 300° C. The product was identified as 1-azabicyclo-[3.2.1]-6-octanol hydrochloride.

B. The crude basic ketone mixture obtained in the previously described Dieckmann condensation (Example 9) can also be reduced directly without isolating the ketone in form of the hydrochloride. Approximately 80 g. of the residue obtained from the benzene extracts were dissolved in 300 cc. of acetic acid and hydrogenated as in Example 10 A above with 4 g. of platinum oxide as catalyst. The catalyst was then filtered off, the solution was made mineral acid with hydrochloric acid and concentrated in vacuo. The residue was heated up with isopropanol, the mixture was cooled to +5° C., and the crystalline product was filtered off. The product was identified as 1-azabicyclo[3.2.1]-6-octanol hydrochloride.

A solution of 50 g. of 1-azabicyclo[3.2.1]-6-octanol hydrochloride in 30 cc. of water was made alkaline with 30 g. of potassium hydroxide. After the alkali was dissolved, 35 g. of granular potassium carbonate were added. The free basic alcohol was then extracted from the viscous mixture by shaking with four portions of boiling benzene (300 cc. in each portion). The benzene extracts were decanted and filtered over anhydrous sodium sulfate, to remove any suspended alkali. The combined benzene solutions were concentrated in vacuo. The residue was recrystallized from petroleum ether; prisms melting at 177°–179° C. It was identified as 1-azabicyclo[3.2.1]-6-octanol.

Alcoholic solutions of 0.5 g. of 1-azabicyclo-[3.2.1]-6-octanol and 1.4 g. picric acid were combined. The precipitated picrate was recrystallized from a mixture of acetone and alcohol; thin yellow plates melting at 224°–226° C.

EXAMPLE 11

*6-diphenylacetoxy-1-azabicyclo[3.2.1]octane*

7.6 g. of diphenylacetyl chloride were added to a solution of 3.8 g. of 1-azabicyclo[3.2.1]-6-octanol in 100 cc. of benzene. The mixture was refluxed for 4 hours, cooled to +5° C. for 24 hours and filtered. The precipitated reaction product was filtered off, and recrystallized by dissolving in methanol, evaporating the solvent in vacuo and treating the residual oil with acetone; fine needles melting at 191°–192° C. This product was identified as 6-diphenylacetoxy-1-azabicyclo[3.2.1]-octane hydrochloride.

To a solution of 5 g. of 6-diphenylacetoxy-1-azabicyclo[3.2.1]octane hydrochloride in 20 cc. of ice water were added 10 cc. of a 3 N sodium hydroxide solution. The precipitated base was extracted with 30 cc. of ether. The ether solution was dried with sodium sulfate and concentrated in vacuo. The residue was recrystallized from petroleum ether; crystals melting at 66°–67° C. This product was 6-diphenylacetoxy-1-azabicyclo[3.2.1]octane.

To a solution of 2 g. of 6-diphenylacetoxy-1-azabicyclo[3.2.1]octane in 20 cc. of ether were added 10 cc. of a 36 per cent ether solution of methyl bromide. After 5 hours the mixture was concentrated and the residue was crystallized by the addition of acetone. The product, 6-diphenylacetoxy-1-azabicyclo[3.2.1]octane methobromide, was recrystallized from a mixture of isopropanol, acetone and ether, forming prisms melting at 165°–167° C.

EXAMPLE 12

*6-(fluorene-9-carboxy)-1-azabicyclo[3.2.1]octane*

7.6 g. of fluorene-9-carboxylic acid chloride were added to a solution of 3.8 g. of 1-azabicyclo-[3.2.1]-6-octanol in 100 cc. of benzene. The mixture was refluxed for 4 hours, depositing a heavy white precipitate. The precipitated reaction product was filtered off, after cooling to +5° C. It was recrystallized by dissolving in methanol, evaporating the solvent in vacuo and crystallizing the residual oil by the addition of acetone; fine plates melting at 227°–232° C. The product was identified as 6-(fluorene-9-carboxy)-1-azabicyclo[3.2.1]octane hydrochloride.

EXAMPLE 13

*1-carbethoxyethyl-3-carbethoxy-piperidine*

A mixture of 109 g. of ethyl nipecotate and 82 g. of ethyl acrylate was heated on the steam bath for 3 hours. The mixture was then distilled in vacuo (100°–104° C./0.1 mm.) yielding a product having a refractive index $n_D^{23}=1.4583$, identified as 1-carbethoxyethyl-3-carbethoxy-piperidine.

EXAMPLE 14

*1-azabicyclo[3.3.1]-4-nonanone*

100 g. of potassium were pulverized in 200 cc. of hot toluene in a heated three-neck flask equipped with an efficient condenser, stirrer and dropping funnel. To the refluxing potassium suspension were cautiously added, in small portions, 257 g. of the diethyl ester of 3-carboxy-piperidine-1 propionic acid (product of Example 13) and about 700 cc. toluene. The addition was finished in about 1 hour. To complete the reaction, the refluxing and stirring were continued for about 5 hours. The reaction mixture was then cooled to about +5° C., and about 50 cc. isopropanol were added to decompose unreacted potassium. Then 2.5 liters of concentrated hydrochloric acid were added. The mixture was refluxed for 15 hours, and then concentrated in vacuo to dryness. To the residue was added with cooling an excess of 50 per cent potassium hydroxide. Ether was then added, and the mixture was filtered through a fritted glass funnel, to remove the precipitated potassium chloride. The organic layer and the aqueous layer were separated and the aqueous layer was extracted repeatedly with 400 cc. portions of ether. The organic solutions were combined, dried over sodium sulfate and concentrated in vacuo. Aqueous hydrochloric acid was added to the residue until the solution became acid. The mixture was then diluted with distilled water to about 300 cc., heated with decolorizing charcoal, filtered and concentrated in vacuo to dryness. The residue was treated with isopropanol, and the precipitated ketone hydrochloride was filtered off. The product, crystallizing in prisms from isopropanol, melted at 248°–249° C., and was identified as 1-azobicyclo[3.3.1]-4-nonanone hydrochloride.

A solution of 5 g. of 1-azabicyclo[3.3.1]-4-nonanone hydrochloride in 3 cc. of water was made alkaline with 3 g. of potassium hydroxide. After the alkali had dissolved, 3 g. of granular potassium carbonate were added. The free basic ketone was then extracted from the viscous mixture by shaking with 4 portions of hot benzene (30 cc. in each portion). The benzene extracts were decanted and filtered over sodium sulfate, in order to remove any suspended alkali, and then concentrated in vacuo. The residual free ketone was purified by recrystallization from petroleum ether. It formed feathery crystals, melting at 95°–98° C.

Alcohol solutions of 0.5 g. of the ketone and 1.0 g. picric acid were combined. The precipitated picrate was recrystallized from a mixture of acetone, ethanol and ether; yellow flat needles melting at 225°–226° C.

EXAMPLE 15

1-azabicyclo[3.3.1]-4-nonanol

A solution of 17.5 g. of 1-azabicyclo[3.3.1]-4-nonanone hydrochloride in 50 cc. water was hydrogenated at room temperature and 50 atm. pressure with 2 g. of platinum oxide as catalyst. After the calculated amount of hydrogen had been absorbed, the mixture was filtered and concentrated in vacuo to dryness. The crude product was recrystallized from methanol; long prisms melting above 300° C. It was identified as 1-azabicyclo[3.3.1]-4-nonanol hydrochloride.

A solution of 5 g. of 1-azabicyclo[3.3.1]-4-nonanol hydrochloride in 3 cc. of water was made alkaline with 3 g. of potassium hydroxide. After the alkali was dissolved, 3 g. of granular potassium carbonate were added. The free basic alcohol was then extracted from the viscous mixture by shaking with four portions of boiling benzene (30 cc. in each portion). The benzene extracts were decanted and filtered over anhydrous sodium sulfate, to remove any suspended alkali. The combined benzene solutions were concentrated in vacuo. The residue was recrystallized from petroleum ether; waxlike prisms melting at 169°–170° C. This product was identified as 1-azabicyclo[3.3.1]-4-nonanol.

EXAMPLE 16

6-diphenylacetoxy-1-azabicyclo[3.3.1]nonane 5.07 g. of diphenylacetyl chloride were added to a solution of 2.82 g. of 1-azabicyclo[3.3.1]-4-nonanol in 100 cc. of benzene. The mixture was refluxed for 14 hours, and then cooled to +5° C. for 24 hours. The precipitated reaction product was filtered off and recrystallized from a mixture of ethanol, ether and petroleum ether; thin plates melting at 214°–216° C. It was identified as 6-diphenylacetoxy-1-azabicyclo[3.3.1]nonane hydrochloride.

EXAMPLE 17

1-($\beta$-carbethoxy-$\beta$-methyl-ethyl)-3-carbethoxy-piperidine

A mixture of 100 g. of ethyl nipecotate and 91.2 g. of ethyl crotonate was heated on the steam bath for 48 hours and then heated for 3 hours to 160° C. The mixture was then distilled in vacuo (129° C./0.15 mm.) yielding a product having a refractive index $n_D^{20}=1.4603$, identified as 1-($\beta$-carbethoxy-$\beta$-methyl-ethyl)-3-carbethoxy-piperidine.

EXAMPLE 18

1-azabicyclo[3.3.1]-2-methyl-4-nonanone 45 g. of potassium were pulverized in 100 cc. of hot toluene in a heated three-neck flask equipped with an efficient condenser, stirrer and dropping funnel. To the refluxing potassium suspension were cautiously added 121.5 g. of the diethyl ester of 3-carboxy-1-piperidine-$\beta$-methyl-propionic acid (the product of Example 17) and about 300 cc. toluene. The addition was finished in about 1 hour. To complete the reaction, the refluxing and stirring were continued for about 4 hours. The reaction mixture was then cooled to about +5° C. and about 20 cc. isopropanol were added to decompose unreacted potassium. Then 1 liter of concentrated hydrochloric acid was added. The mixture was refluxed for 15 hours, and then concentrated in vacuo to dryness. To the residue was added with cooling an excess of 50 per cent potassium hydroxide. Benzene was added, and the mixture was filtered through a fritted glass funnel, thus removing the precipitated potassium chloride. The organic and the aqueous layers were separated, and the aqueous layer was extracted repeatedly with 200 cc. portions of benzene. The organic solutions were combined, dried with sodium sulfate and concentrated in vacuo. Aqueous hydrochloric acid was added to the residue until the solution became acid. The mixture was then diluted with distilled water to about 300 cc., heated with decolorizing charcoal, filtered and concentrated in vacuo to dryness. The residue was treated with isopropanol, and the precipitated ketone hydrochloride was filtered off. The product, 1-azabicyclo[3.3.1]-2-methyl-4-nonanone hydrochloride, crystallized in prisms from ethanol. It melted at 206°–207° C.

EXAMPLE 19

1-azabicyclo[3.3.1]-2-methyl-4-nonanol

A solution of 14.0 g. of 1-azabicyclo[3.3.1]-2-methyl-4-nonanone hydrochloride in 50 cc. water was hydrogenated at room temperature and 100 atm. pressure with 1 g. of platinum oxide as catalyst. After the calculated amount of hydrogen had been absorbed, the mixture was filtered and concentrated in vacuo to dryness. The crude product was recrystallized from methanol with the addition of ether; prisms melting at 250°–254° C. It was identified as 1-azabicyclo[3.3.1]-2-methyl-4-nonanol hydrochloride.

A solution of 5 g. of 1-azabicyclo[3.3.1]-2-methyl-4-nonanol hydrochloride in 3 cc. water was made alkaline with 3 g. of potassium hydroxide. After the alkali had dissolved, 3 g. of granular potassium carbonate were added. The free basic alcohol was then extracted from the viscous mixture by shaking with four portions of boiling benzene (30 cc. in each portion). The benzene extracts were decanted and filtered over anhydrous sodium sulfate, to remove any suspended alkali. The combined benzene solutions were concentrated in vacuo. The residue was recrystallized from petroleum ether, forming long needles or hygroscopic short prisms melting at 70°–73° C. These two forms gave no melting point depression with each other and could be converted into each other by recrystallization from solutions of different concentrations. The product was identified as 1-azabicyclo[3.3.1]-2-methyl-4-nonanol.

Alcoholic solutions of 0.2 g. of the above alcohol and 0.4 g. of picric acid were combined. The picrate was recrystallized from a mixture of acetone and alcohol, forming yellow needles melting at 262°–263° C.

EXAMPLE 20

*4 - diphenylacetoxy-1-azabicyclo[3.3.1]-2-methyl-nonane*

3.93 g. of diphenylacetyl chloride were added to a solution of 2.33 g. of 1-azabicyclo[3.3.1]-2-methyl 4-nonanol in 75 cc. of benzene. The mixture was refluxed for 5 hours, diluted with petroleum ether, and cooled to +5° C. for 24 hours. The precipitated reaction product was filtered off, and recrystallized from a mixture of acetone and petroleum ether; prisms melting at 188°–190° C. It was identified as 4-diphenylacetoxy-1-azabicyclo[3.3.1]-2-methyl-nonane hydrochloride.

EXAMPLE 21

*1-azabicyclo[2.2.2]-3-methyl-3-octanol*

40 cc. of benzene containing 5 g. of 1-azabicyclo[2.2.2]-3-octanone were added to 50 cc. of ether containing the quantity of methyl lithium prepared from 1.4 g. of lithium metal and an excess of methyl bromide. The mixture was stirred and refluxed for 2 hours. It was then decomposed by the addition of 20 cc. of water. 10 g. of potassium hydroxide were added, and then sufficient potassium carbonate was added to convert the aqueous layer into a paste. The reaction product was extracted by thrice stirring up the paste with benzene and each time decanting the organic solution. The combined organic solutions were dried, concentrated in vacuo, and the residue was recrystallized from a mixture of ether and petroleum ether, forming prisms melting at 109°–111° C. This product was 1-azabicyclo-[2.2.2]-3-methyl-3-octanol.

To a solution of 1.4 g. of 1-azabicyclo[2.2.2]-3-methyl-3-octanol in 20 cc. of ethanol were added 10 cc. of 1 N hydrochloric acid. The solution was concentrated in vacuo, and the residue was recrystallized from a mixture of ethanol and acetone; prisms melting at 291°–292° C. The product was 1-azabicyclo[2.2.2]-3-methyl-3-octanol hydrochloride.

EXAMPLE 22

*3-diphenylacetoxy-3-methyl-1-azabicyclo-[2.2.2]octane*

A mixture of 2.2 g. of 1-azabicyclo[2.2.2]-3-methyl-3-octanol, 4.3 g. of diphenylacetyl chloride and 25 cc. of benzene was refluxed for 20 hours. The mixture was cooled and extracted with water. The aqueous layer was made alkaline with sodium hydroxide and the precipitated reaction product was extracted with ether. The ether solution was concentrated in vacuo and the residue was recrystallized from petroleum ether; prisms melting at 85°–87° C. The product was 3 - diphenylacetoxy - 3-methyl - 1 - azabicyclo-[2.2.2]octane.

To a solution of 3.35 g. of the above ester base in 20 cc. ethanol were added 10 cc. of 1 N sulfuric acid. The solution was concentrated in vacuo and the residue was recrystallized from acetone; prisms melting at 205°–206° C. The product was 3-diphenylacetoxy-3-methyl-1-azabicyclo[2.2.2]octane sulfate.

To a solution of 1 g. of the above ester base in 20 cc. of ether were added 10 cc. of a 25 per cent solution of methyl bromide in acetone. After 24 hours, the mixture was concentrated and the residue was recrystallized from acetone; needles or prisms melting at 176°–177° C. This product was 3-diphenylacetoxy-3-methyl-1-azabicyclo[2.2.2]octane methobromide.

EXAMPLE 23

*6-benziloyloxy-1-azabicyclo[3.2.1]octane*

6.5 g. of 1-azabicyclo[3.2.1]-6-octanol were refluxed with a suspension of 0.92 g. of finely divided sodium in 50 cc. of toluene until most of the sodium reacted (about 4 hours). The suspension of the white amorphous alcoholate thus obtained was cooled with ice and reacted with 7.9 g. of diphenylchloroacetyl chloride, which was added in form of a solution in 30 cc. of toluene. The mixture was stirred for 1 hour at room temperature. Small amounts of unreacted sodium were destroyed with isopropanol, and 120 cc. of 1 N hydrochloric acid were then added. The mixture was refluxed for 10 minutes, in order to convert the diphenylchloroacetate formed into the benzilate. The toluene phase was separated and discarded. The aqueous phase was made alkaline and extracted repeatedly with ether. The ether solution was concentrated in vacuo, and the residue was crystallized by the addition of ether and petroleum ether. The product, 6-benziloyloxy-1-azabicyclo[3.2.1]octane, was recrystallized from a mixture of acetone and petroleum ether; prisms melting at 156°–157° C.

To a solution of 0.5 g. of 6-benziloyloxy-1-azabicyclo[3.2.1]octane in 5 cc. of methanol were added 5 cc. of a 36 per cent acetone solution of methyl bromide. After 20 minutes the mixture was concentrated and the residue was crystallized from a mixture of methanol, acetone and petroleum ether; prisms melting at 231°–233° C. The product was 6-benziloyloxy-1-azabicyclo-[3.2.1]octane methobromide.

EXAMPLE 24

*3-(acetylmandelyloxy)-1-azabicyclo[2.2.2]-octane*

A mixture of 1-azabicyclo[2.2.2]-3-octanol, 4.2 g. of acetylmandelyl chloride and 100 cc. of benzene was refluxed for 6 hours. 20 cc. of petroleum ether were added, and the mixture was left at room temperature for 24 hours. The precipitated reaction product was filtered off and purified by crystallization from a mixture of ethanol, ether and petroleum ether; needles melting at 169°–178° C. This product was 3-(acetylmandelyloxy)-1-azabicyclo[2.2.2]octane.

EXAMPLE 25

*l-1-azabicyclo[2.2.2]-3-octanol*

10.2 g. of d,l-1-azabicyclo[2.2.2]-3-octanol and 19.0 g. of d-camphorsulfonic acid were dissolved in a hot mixture of 40 cc. of isopropanol and 150 cc. of acetone. The solution was left at room temperature for 60 hours; the crystals formed were then filtered off and recrystallized from a hot mixture of 40 cc. of isopropanol and 50 cc. of acetone. The precipitate, which had a specific rotation $[\alpha]_D^{25} = +0.65°$ ($c=7$ per cent in $H_2O$), was again recrystallized from 35 cc. of isopropanol and 70 cc. of acetone, yielding rhombic plates $[\alpha]_D^{25} = -0.3°$ ($c=7$ per cent in $H_2O$), which melted with decomposition at about 260° C. The specific rotation and the decomposition point did not change upon further crystallization.

The first mother liquor, obtained after separation of the first crude crystal crop, yielded upon concentration large irregular thin plates decomposing at about 260° C., $[\alpha]_D^{25}=+20.0°$ ($c=7$ per cent in $H_2O$), consisting of a mixture of the two isomeric d-camphorsulfonates.

To a solution of 2.8 g. of the d-camphorsulfonate of 1-azabicyclo[2.2.2]-3-octanol $$([\alpha]_D^{25}=-0.3°)$$

in 2 cc. of water were added 1.4 g. of potassium hydroxide and 2.8 g. of potassium carbonate. The viscous mixture was extracted a few times with boiling ether and boiling benzene. The combined decanted organic solutions were again heated, dried with anhydrous sodium sulfate, and filtered. The solution was concentrated in vacuo, and the residue was recrystallized from acetone; prisms melting at 220°–222° C. The compound showed no melting point depression when mixed with d,l-1-azabicyclo[2.2.2]-3-octanol. This product was l-1-azabicyclo[2.2.2]-3-octanol, $[\alpha]_D^{25}=-2.0°$ ($c=6.5$ per cent in $H_2O$); $[\alpha]_D^{25}=-43.8°$ ($c=3$ per cent in 1 N HCl).

EXAMPLE 26

*l-3-diphenylacetoxy-1-azabicyclo[2.2.2]octane*

A mixture of 0.5 g. of l-1-azabicyclo[2.2.2]-3-octanol, 1.0 g. of diphenylacetyl chloride and 30 cc. of benzene was refluxed for 5 hours. It was then cooled and acidified with hydrochloric acid. The aqueous solution was separated and washed with ether. The base was liberated by the addition of an excess of ice cold alkali, and was extracted into ether. The ether solution was dried and concentrated in vacuo. The residual basic ester solidified after a short time and was recrystallized from petroleum ether; needles or long prisms melting at 89°–90° C. The substance showed no melting point depression when mixed with the racemate melting at 95°–96° C. (Example 4). $[\alpha]_D^{25}=-10.0°$ ($c=3.3$ in 0.5 N HCl). This product was l-3-diphenylacetoxy-1-azabicyclo[2.2.2]octane.

EXAMPLE 27

*d-3-diphenylacetoxy-1-azabicyclo[2.2.2]octane*

17.7 g. of the mixture of isomeric d-camphorsulfonates ($[\alpha]_D^{25}=+20°$), obtained from the first mother liquor as described in Example 25, were dissolved in 10 cc. of water. 10 g. of potassium hydroxide and 20 g. of potassium carbonate were added and the resulting paste was extracted repeatedly with hot benzene and ether. The combined decanted organic solutions were again heated, dried with anhydrous sodium sulfate, filtered, and concentrated in vacuo. The residue was dissolved in 300 cc. of benzene, 10 g. of diphenylacetyl chloride were added and the mixture was refluxed for 18 hours. It was then cooled and acidified with dilute hydrochloric acid. The acidic aqueous solution was diluted with cold water and separated and washed with ether. The base was liberated by the addition of an excess of ice cold alkali and was extracted into ether. The ether solution was dried and concentrated in vacuo. The residual basic ester, consisting of a mixture of the racemic and the dextro-rotatory modifications, solidified after a short time. The two forms were separated by fractional crystallization as follows: The mixture was dissolved in about 3 liters of boiling petroleum ether (B. P. 30°–60° C.). The filtered solution was concentrated under atmospheric pressure to about 1 liter and left at room temperature for several hours. The separated crystals (irregular prisms) were filtered off. They consisted mostly of the racemic modification, containing only small amounts of the dextro-rotatory isomer (about 7 per cent, as calculated from the optical rotation). The mother liquor was concentrated further and the resulting crystals were separated. This procedure was repeated several times and the precipitated irregular prisms, consisting of mixtures of the racemate and the optically active compound, were set aside.

Finally the pure dextro-rotatory compound crystallized out, forming needles or long prisms. These were recrystallized from petroleum ether; needles or long prisms melting at 89°–90° C. $[\alpha]_D^{25}=+10.5°$ ($c=3.3$ in 0.5 N HCl). This product was d-3-diphenylacetoxy-1-azabicyclo[2.2.2]octane.

This application is a continuation-in-part of my copending application Serial No. 154,737, filed April 7, 1950.

I claim:

1. A compound selected from the group consisting of acyloxy-1-azabicycloalkanes and their salts, the acyl radical being that of an acid selected from the group consisting of diphenylacetic acid, benzilic acid, fluorene-9-carboxylic acid, acetylmandelic acid, tropic acid, and atropic acid, and the 1-azabicycloalkanyl radical being that of a 1-azabicycloalkanol selected from the group consisting of 1-azabicyclo[2.2.2]-3-octanol, 1-azabicyclo[2.2.2]-3-methyl-3-octanol, 1-azabicyclo[3.2.1]-6-octanol, 1-azabicyclo[3.3.1]-4-nonanol, and 1-azabicyclo[3.3.1]-2-methyl-4-nonanol.

2. 3-diphenylacetoxy - 1 - azabicyclo[2.2.2] octane.

3. A salt of 3-diphenylacetoxy-1-azabicyclo[2.2.2]octane.

4. 3-diphenylacetoxy - 1 - azabicyclo[2.2.2]octane sulfate.

5. 3-benziloyloxy-1-azabicyclo[2.2.2]octane.

6. A salt of 3-benziloyloxy-1-azabicyclo[2.2.2]octane.

7. 3 - benziloyloxy - 1 - azabicyclo[2.2.2]octane methobromide.

8. 3 - benziloyloxy - 1 - azabicyclo[2.2.2]octane ethobromide.

9. A lower alkyl halide quaternary salt of 3-benziloyloxy-1-azabicyclo[2.2.2]octane.

LEO HENRYK STERNBACH.

References Cited in the file of this patent

UNITED STATES PATENTS

| Number | Name | Date |
|---|---|---|
| 2,143,491 | Miescher et al. | Jan. 10, 1939 |

OTHER REFERENCES

Chem. Abs., vol. 35, p. 7967 (1941).